United States Patent
Niemeyer et al.

(10) Patent No.: US 10,828,841 B2
(45) Date of Patent: Nov. 10, 2020

(54) METHOD FOR CLOSING A HOLE WITH A DIECUT

(71) Applicant: tesa SE, Norderstedt (DE)

(72) Inventors: Thomas Niemeyer, Kaltenkirchen (DE); Rainer Stricker, Augsburg (DE)

(73) Assignee: TESA SE, Norderstedt (DE)

( * ) Notice: Subject to any disclaimer, the term of this patent is extended or adjusted under 35 U.S.C. 154(b) by 401 days.

(21) Appl. No.: 14/913,410

(22) PCT Filed: Jul. 23, 2014

(86) PCT No.: PCT/EP2014/065807
§ 371 (c)(1),
(2) Date: Feb. 22, 2016

(87) PCT Pub. No.: WO2015/024725
PCT Pub. Date: Feb. 26, 2015

(65) Prior Publication Data
US 2016/0271866 A1    Sep. 22, 2016

(30) Foreign Application Priority Data

Aug. 23, 2013  (DE) .................. 10 2013 216 778

(51) Int. Cl.
*B29C 65/48* (2006.01)
*B29C 65/02* (2006.01)
(Continued)

(52) U.S. Cl.
CPC .............. *B29C 65/48* (2013.01); *B29C 65/02* (2013.01); *B60R 13/06* (2013.01); *B29C 73/10* (2013.01); *B29L 2031/30* (2013.01)

(58) Field of Classification Search
CPC ......... B29C 65/48; B29C 65/02; B29C 73/10; B60R 13/06; B29L 2031/30
(Continued)

(56) References Cited

U.S. PATENT DOCUMENTS 6,586,080 B1 * 7/2003 Heifetz ............... B29C 63/0017
428/198
6,613,870 B1   9/2003 Harder et al.
(Continued)

FOREIGN PATENT DOCUMENTS

DE    4313008 C1    11/1994
DE    10003810 A1    8/2001
(Continued)

OTHER PUBLICATIONS

ASTM D792 Standard Test Methods for Density and Specific Gravity of Plastic by Displacement.*
(Continued)

*Primary Examiner* — Michael N Orlando
*Assistant Examiner* — Christian Roldan
(74) *Attorney, Agent, or Firm* — Norris McLaughlin, P.A.

(57) ABSTRACT

A blank and/or diecut permanently closes of holes in metal sheets and/or in plastic parts. The blank and/or diecut comprises at least one carrier having a laminate of at least two polymeric films, wherein the lower film has a basis weight of at least 1.5 kg/m² and the side of the lower film opposite the upper film has an applied adhesive thereon.

20 Claims, 2 Drawing Sheets

(51) Int. Cl.
*B60R 13/06* (2006.01)
*B29C 73/10* (2006.01)
*B29L 31/30* (2006.01)

(58) Field of Classification Search
USPC .......................................................... 156/60
See application file for complete search history.

(56) References Cited

U.S. PATENT DOCUMENTS

| | | |
|---|---|---|
| 2003/0132057 A1 | 7/2003 | Rust et al. |
| 2004/0076841 A1 | 4/2004 | Sauer et al. |
| 2008/0029919 A1 | 2/2008 | Howe et al. |
| 2008/0099944 A1* | 5/2008 | Lipprandt ............... B32B 15/08 264/41 |
| 2008/0113166 A1 | 5/2008 | Kolmorgen et al. |
| 2012/0000591 A1 | 1/2012 | Muessig et al. |

FOREIGN PATENT DOCUMENTS

| | | |
|---|---|---|
| DE | 10062859 A1 | 6/2002 |
| DE | 10146480 A1 | 4/2003 |
| DE | 10342753 A1 | 9/2004 |
| DE | 102006038322 A1 | 2/2008 |
| DE | 102009005517 A1 | 7/2010 |
| DE | 102010051786 A1 | 7/2011 |
| DE | 102010052417 A1 | 5/2012 |
| DE | 202012101764 U1 | 8/2013 |
| EP | 1526164 A1 | 4/2005 |
| EP | 1693190 A1 | 8/2006 |
| EP | 2474971 A1 | 7/2012 |
| JP | H 0661892 B2 | 8/1994 |
| JP | 2008-520453 A | 6/2008 |
| WO | 2005097582 A1 | 10/2005 |
| WO | 2006053827 A1 | 5/2006 |

OTHER PUBLICATIONS

Roempp, George Thieme Verlag.; "Strukturklebstoffe"; Document Code RD-19-04489; last updated Sep. 2012.
Satas, Donatas, "Handbook of Pressure Sensitive Adhesive Technology", 1999, pp. 1-857, Third Edition, Satas & Associates, Warwick, Rhode Island.
English translation of Japanese Office Action for corresponding Japanese Application No. dated May 18, 2018.
English-language translation of International Search Report for Application No. PCT/EP2014/065807 dated Oct. 15, 2014.
Fox, T. G.; "Influence of Diluent and of Copolymer Composition on the Glass Temperature of a Polymer System"; Am. Phys. Soc. 1; Rohm & Haas Company; 1956; p. 123.

* cited by examiner

METHOD FOR CLOSING A HOLE WITH A DIECUT

This application is a § 371 national stage of PCT International Application No. PCT/EP2014/065807, filed Jul. 23, 2014, which claims foreign priority benefit under 35 U.S.C. § 119 of German Patent Application No. 10 2013 216 778.4, filed Aug. 23, 2013.

The present invention relates to a diecut especially for the permanent closing of holes which are located preferably in metal sheets or in plastics parts, and also to a method for permanently closing holes.

In the fabrication of relatively complex structures from metal sheets and/or plastics, constructional dictates make it impossible to avoid having to cut holes into the sheets or plastics, in order to gain access to cavities situated behind them, whether for the purpose of painting or for the purpose of welding.

When the desired operation has been concluded, these holes are usually no longer needed, and are often in fact disruptive, since they allow the passage of air, atmospheric moisture, or water into the structure, which may lead, for example, to processes of oxidation (rust).

One simple solution to avoiding these problems is to close the holes again after use.

Particularly in the production of modern vehicles such as watercraft, land vehicles (trucks, automobiles, etc.), air vehicles, space vehicles, and combinations thereof, such as amphibious vehicles, for example, it is inevitable that during assembly, in numerous individual parts made from metal sheets or plastics, holes of different sizes are required. The hole diameters are customarily between 5 and 50 mm. In subsequent operation, many of these holes must be given airtight and in particular watertight closure again, in order to prevent said corrosive attacks.

Another requirement is to achieve a considerable improvement in the soundproofing of the passenger interior through the closing of the holes.

The problems underlying the invention, and also the solution to these problems, are described below using the body of an automobile as an example. This expressly does not restrict the concept of the invention to said application. Said application is part of the technical field in which the invention is manifested to particular advantage.

If from this point on there is reference to use in a vehicle body, the skilled person reads this as embracing all other application possibilities as well as a vehicle body.

In automobile construction, holes must be made, by punching, for instance, at various locations in the vehicle body. Generally this is done as part of the operation of punching and forming the individual sheet-metal or aluminum parts; additionally, holes may also be drilled in plastics components. Subsequently, by means of a variety of joining processes, the individual metal parts are connected with one another, and the bodyshell is formed. The uses of the holes, openings, or passages in this bodyshell include their use as paint drainage holes (for cathodic electrocoat materials, for example), wax injection holes, wax drainage holes, holes for later screw-mounting operations in assembly, or for cable passages. After the cathodic electrocoat material has dried, many of these holes must be closed again, or else must be closed after the final clearcoat operation (in which case hole closure would take place in the assembly process).

There are many possible reasons why it is necessary for a hole to be closed, examples being:
moisture
acoustics
corrosion prevention Generally speaking, the holes or openings are closed by means of injection-molded parts (plugs) made from various polymers manufactured according to the profile of requirements. These may be, for example, plugs made from PET, ABS, PP, PVC, EPDM, PA, and other commercial polymers, or else combinations of the stated materials and customary commercial polymeric substrates not listed here. Also in use are materials which possess a glass fiber fraction; also conceivable are carbon fibers, which strengthen the plug against being punctured, for example. In principle all common polymeric substrates are possible, provided they offer particular parameters in relation to paintability, temperature stability, and dimensional stability under climatic conditions, and also fulfill a certain economy in the plug manufacturing process.

At the present time, vehicle bodywork holes are generally closed using plastics plugs which on the one hand, in a particular case, do not securely close the hole, and on the other hand are comparatively complicated and expensive to produce.

Each size of hole requires a specific plug adapted to the hole size. This entails high logistical and administrative effort for the consumer of the plugs.

On the production line it is necessary accordingly to hold a large number of plugs of different sizes in individually assigned storage crates.

Also suitable for this purpose are adhesive tapes, which are cut to length or punched in accordance with the hole size. Adhesive tapes as well, however, do not always do justice to the increasingly high market requirements.

As already described in WO 2006/053827 A1, systems suitable for the specific closing of holes include diecuts which consist of an at least partially unilaterally self-adhesively furnished base layer comprising a heat-resistant carrier, the area of which is greater than the area of the hole to be closed, and which is provided, in particular centrally on the adhesively furnished side, with a first section of a heat-activatable adhesive film, the area of which is greater than the area of the hole to be closed and less than the area of the base layer. The diecut is applied over the hole to be closed in such a way that the hole is covered substantially by the first section. The heat-activatable adhesive films described are highly suitable for sealing, but are comparatively expensive.

The possibility of introducing a component into the diecut, said component fully filling and/or covering the hole at elevated temperature, such as in a drying step, in the painting area, by foaming up, is described in WO 2005/097582 A1. It is found, however, that the unfoamed component must exhibit high expansion in order to ensure full hole closure, since the direction of spread is limited only by the adhesion side to the unilaterally self-adhesive diecut. As a result of this necessary high degree of foaming, the density of material in the resulting hole closure is comparatively low, with adverse consequences for the soundproofing properties. In addition, a hole closure of this kind proves to have only little strength in terms of the adhesion of foam to the metal sheet, since the material makes contact only with the edge of the hole and a little metal sheet on the side facing away from the diecut part. The result of this is a low level of puncture resistance, with puncture resistance being of critical importance to the area of application described.

The intention here is to look more closely at the self-adhesive hole closures, which are required to achieve an acoustic effect.

These acoustically relevant hole closures are often used in assembly in order to obtain an isolated region, the vehicle interior, within the passenger cell. Disruptive acoustics in the vehicle interior are generated, for example, by rolling noises from the tires or else by loose gravel and also small chippings which are thrown against the vehicle paneling and also against the vehicle's structural members. Moreover, wind noises which come about as a result of unstreamlined design are another possible cause of a relatively high, unwanted noise level within the passenger cell.

The noise caused by loose gravel, chips, rolling noises from the tires, and by unevennesses in the ground is often transmitted into the cavities in the structural member systems (side and cross members) and into the vehicle interior or passenger cell. As a result of this, products with acoustic activity must also be employed outside the vehicle. One form of effective acoustic protection, for example, is to tape off holes in the floor assembly or in the vehicle platform. Holes, punched apertures, or drilled apertures are often made in the side and cross members. Here, particular attention must be paid to carefully closing every possible opening.

As already described, numerous holes in the sheet-metal bodywork parts, or in the structural member systems, serve to allow the cathodic electrocoat material to drain as rapidly as possible from the body and from all kinds of cavities, in order to secure operating time. This means, conversely, that the openings and holes must be reliably closed immediately downstream of the cathodic electrocoat dryer. Generally this is done on what is called the PVC line. This area relates to a manufacturing step which takes place before application of primer-surfacer or before application of basecoat material. A further feature to be fulfilled, therefore, is repaintability for products which are employed within this production segment. Moreover, there must be compatibility with PVC seam-sealing material, since gaps are sealed with pumpable PVC compounds between the cathodic electrocoat dryer and the next coating layer.

It is an object of the invention to provide a diecut which is suitable for permanently closing holes, especially in metal sheets or in plastics parts of automobile bodies, and which closes said holes such that moisture penetration is impossible, and which enhances soundproofing and which reliably closes the holes even on stone chipping in the underfloor region and on mechanical stresses within the interior, especially in the floor area.

This object is achieved by means of a diecut as specified in the main claim. The dependent claims relate to advantageous onward developments of the subject matter of the invention, and also to a method for permanently closing holes.

Figure 1:
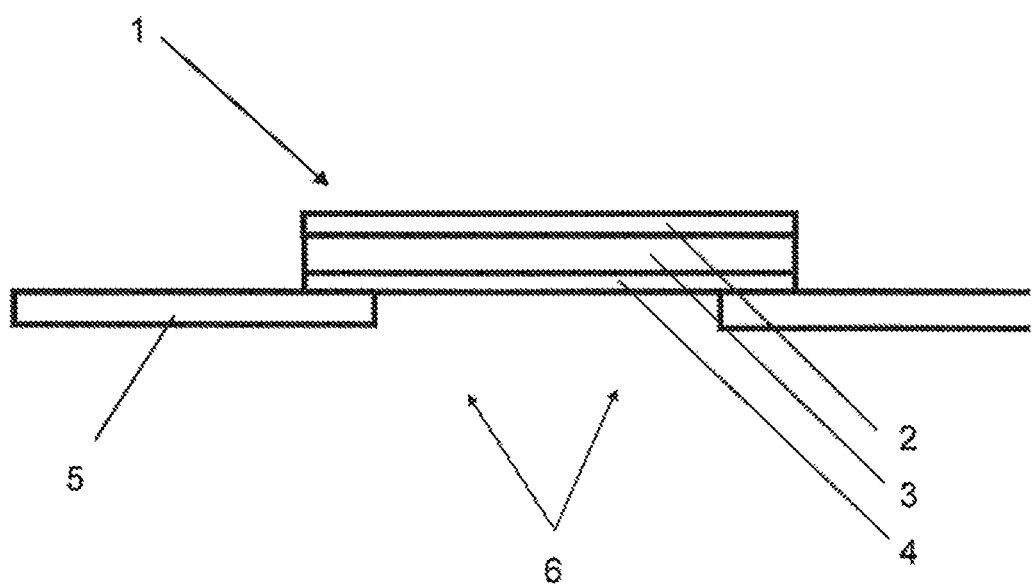
FIG. 1 is a side plan view of a diecut joined to a body such that a hole in the body is closed and/or covered by the diecut in an embodiment.

The invention accordingly provides a diecut especially for the permanent closing of holes, particularly in metal sheets or in plastics parts, having a carrier composed of a laminate of at least two polymeric films, the lower film having a basis weight of at least 1.5 kg/m² and the lower film, on the side opposite the upper film, bearing an applied adhesive, more particularly a self-adhesive or curable adhesive.

According to one preferred embodiment of the invention, the lower film has a basis weight of between 1.5 and 6 kg/m², preferably between 1.5 and 3.9 kg/m², more preferably between 1.5 and 2.5 kg/m².

The lower film is preferably a heavy-duty film such as a polyolefin film, more particularly a mineral-filled polyolefin film, or an elastomer-modified bitumen film.

Possible production variants for a heavy-duty film of this kind are extrusion operations or casting operations.

A heavy-duty film consists of a filmlike layer of any desired thickness, more particularly from 0.015 mm up to more than 12 mm, with the heavy-duty film being composed more particularly of thermoplastic polymers, especially PE (polyethylene), EPDM (ethylene-propylene-diene rubber) and/or EVA (ethylene-vinyl acetate), and of mineral fillers, more particularly finely ground limestone or calcite ($CaCO_3$) and barite ($BaSO_4$). Additionally used for filling may be talc, finely ground slate, graphite, mica, or asbestos (the latter nowadays less so).

The fraction of fillers is in particular 30 to 90 wt %, preferably 40 to 70 wt %.

Expressed as a volume percentage, the fraction is preferably 30 to 60 vol %, more preferably 45 to 55 vol %.

The heavy-duty film may additionally comprise oil for swelling and for better accommodation of the fillers. The oil content may be between 8 vol % to 20 vol %.

Instead of an upper film it is possible for there to be a diecuttable aluminum sheet, a corrosion-resistant steel sheet, or an aluminum foil with a laid scrim for reinforcement or strength laminated to the lower film.

The upper film may consist of any desired polymers, either alone or in a mixture.

Suitable polymers are olefinic polymers such as homopolymers or copolymers of olefins such as ethylene, propylene, or butylene (the term "copolymer" is to be understood here as including terpolymers), polypropylene homopolymers or polypropylene copolymers, including the block (impact) polymers and random polymers.

Further polymers may be selected from the group of the polyesters such as, in particular, polyethylene terephthalate (PET), polyamides, polyurethanes, polyoxymethylene, polyvinyl chloride (PVC), polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), polyarylene sulfides and/or polyarylene oxides.

These polymers, alone or in a mixture, are also suitable for forming the heavy-duty film.

The upper film consists preferably of polyester (more particularly of polyethylene terephthalate (PET)), polyurethane, or PVC.

The polymers for forming the upper film and the lower film may be present in pure form or in blends with additives such as antioxidants, light stabilizers, antiblocking agents, lubricants and processing aids, fillers, dyes, pigments, blowing agents, or nucleating agents.

The films preferably have none of the stated additives.

According to a further embodiment, the carrier may also have more than two films. In particular, the upper carrier film may consist of an at least two-ply laminate composed of two or more film plies made from any desired material (for example, from polyethylene, polypropylene, polyester, PA and/or PVC).

In one advantageous development of the invention, there is a layer-form body present within the carrier (between the upper and lower films) or on the carrier that consists of metal, of a metal foil, aluminum foil for example, or of a foil comprising metal.

According to one preferred embodiment, the thickness of the upper film is between 15 and 350 μm, preferably between 30 and 200 μm, more preferably between 50 and 150 μm.

According to one preferred embodiment, the thickness of the lower film is between 600 and 3500 μm, preferably between 1100 and 3500 μm, more preferably between 1700 and 3500 μm.

According to another preferred embodiment, the thickness of the lower film is between 600 and 1100 μm, between 1100 and 1700 μm, or between 1700 and 3500 μm.

In a further advantageous embodiment of the invention, the upper and/or lower films are/is reinforced by integrated and/or attached fibers or filaments, in such a way that the strength of the film or films is reinforced especially in the longitudinal direction.

For the purposes of this invention, a filament refers to a bundle of parallel individual linear fibers often also referred to in the literature as a multifilament. This fiber bundle may optionally be given inherent strengthening by torsion, and is then referred to as spun or folded filaments. Alternatively the fiber bundle can be given inherent strengthening by entangling using compressed air or water jets. In the text below, for all of these embodiments—and also for the fiber-reinforced embodiment—only the term "filament" will be used, in a generalizing way.

If a film is reinforced exclusively by filaments integrated/attached in the longitudinal direction, the resulting adhesive tapes are referred to as monofilament tapes. In one advantageous development of the subject matter of the invention, the upper film and/or the lower film are/is reinforced by an open filament fabric. In this case it is referred to as crosswoven filament tape.

Filaments added are high-strength fibers, folded yarns, folded union yarns, or threads with low elongation at break.

The individual filaments are preferably continuous filaments and/or have a linear density of between 4 and 8 dtex, preferably 5 dtex. In one advantageous embodiment all of the filaments are continuous filaments.

In one preferred embodiment there are between 1 and 30 filaments per centimeter width in the carrier material, more particularly between 1 and 5.

These filaments may consist of organic or inorganic materials, as for example and preferably of glass, carbon, combinations of both types of fiber, aramid fibers or special polyamides, of drawn polymer fibers such as polyester fibers, polypropylene fibers, and polyethylene fibers; furthermore, the reinforcing fibers may be at least partly colored, in order to make the carrier material visually more appealing. In this way it is readily possible to provide for visual differentiation of the reinforced carriers. Colored glass threads or polymer threads are especially appropriate for this purpose.

The film or films are further preferably laminated with the filaments. The filaments should be firmly connected to the film or films. This can be done by direct incorporation or insetting of the fibers, threads, folded yarns or folded union yarns into the film or films, such as by weaving them in the case of wovens, knitting them in the case of knits, or embedding or inserting them in the course of the production process.

Alternatively the filaments may be connected subsequently to the film or films; for example, mention may be made of their welding or lamination to a corresponding connection layer.

Furthermore, the reinforcements are preferably inserted deliberately in accordance with the direction of stress of the carrier, in other words primarily in the longitudinal direction. Also, however, if more appropriate, they may additionally run in transverse or crosswise direction or, for example, with a curved, spiral, or zig-zag formation, or irregularly.

In accordance with the invention, the curable adhesive used in one inventive variant is understood to be a structural adhesive (construction adhesive, assembly adhesive) (see Römpp, Georg Thieme Verlag, document code RD-19-04489, last updating: September 2012). According to DIN EN 923: 2006-01, structural adhesives are adhesives which form bonds which are able to maintain a specified strength for a predetermined, relatively long time span within a structure (according to the ASTM definition: "bonding agents used for transferring required loads between adherends exposed to service environments typical for the structure involved"). They are therefore adhesives for bonds capable of accommodating high chemical and physical stresses, these adhesives contributing in the cured state to the strengthening of the bonded substrates and being used for producing constructions of metals, ceramic, concrete, wood, or reinforced plastics. The structural adhesives of the invention are based in particular on (heat-curable) reactive adhesives (phenolic resins, epoxy resins, polyimides, polyurethanes, etc.).

After curing, the curable adhesive may be elastic, in order to ensure a permanent closure which is insensitive to vibrations and twisting.

According to one advantageous embodiment of the invention, the curable adhesive is self-adhesive, or a layer of self-adhesive composition is applied at least partially on the curable adhesive.

Adhesives used are, in particular, reactive, heat-activatable adhesives.

These adhesives possess very good dimensional stability if the elastomeric component has a high elasticity. Furthermore, the reactive resins allow a crosslinking reaction to occur that significantly increases the bonding strength. Thus, for example, heat-activatable adhesives based on nitrile rubbers and phenolic resins can be used, available commercially in the product 8401 from tesa, for example.

According to one advantageous embodiment, the adhesive consists at least of
a) a polyamide having amino and/or acid end groups,
b) an epoxy resin,
c) optionally a plasticizer,
the polyamide reacting with the epoxy resin at temperatures of at least 150° C., and the ratio in weight fractions of a) and b) being between 50:50 to 99:1.

With further preference the adhesive consists of
i) a thermoplastic polymer with a fraction of 30 to 89.9 wt %,
ii) one or more tackifying resins with a fraction of 5 to 50 wt % and/or
iii) epoxy resins with hardeners, optionally also accelerators, with a fraction of 5 to 40 wt %.

This adhesive is a mixture of reactive resins which crosslink at room temperature and form a three-dimensional, high-strength polymer network, and of permanently elastic elastomers which counter embrittlement of the product. The elastomer may originate preferably from the group of the polyolefins, polyesters, polyurethanes, or polyamides, or may be a modified rubber such as nitrile rubber, for example.

The especially preferred thermoplastic polyurethanes (TPU) are known reaction products of polyester polyols or polyether polyols and organic diisocyanates such as diphenylmethane diisocyanate. They are composed of predominantly linear macromolecules. Products of this kind are available commercially usually in the form of elastic pellets, as for example from Bayer AG under the trade name "Desmocoll".

Through combination of TPU with selected compatible resins it is possible to lower the softening temperature of the adhesive. In parallel with this there is in fact an increase in the adhesion. Examples of resins which have proven suitable include certain rosins, hydrocarbon resins, and coumarone resins.

Alternatively to this, the reduction in the softening temperature of the adhesive can be achieved through the combination of TPU with selected epoxy resins based on bisphenol A and/or F and on a latent hardener. An adhesive comprising a system of this kind allows the joint to harden subsequently, either gradually at room temperature without any further external intervention, or in a short time by means of controlled heating.

As a result of the chemical crosslinking reaction of the resins, high strengths are obtained between the adhesive and the surface to be bonded, and a high internal strength is achieved in the product.

The addition of these reactive resin/hardener systems here also leads to a lowering of the softening temperature of the abovementioned polymers, which has the advantageous effect of lowering their processing temperature and processing speed. The suitable product is a product which is self-adhesive at room temperature or slightly elevated temperatures. On heating of the product, there is also a lowering of the viscosity for a short time, allowing the product to wet even rough surfaces.

The compositions for the adhesive can be widely varied by modifying the nature and proportion of the raw materials. Similarly, further product properties, such as color and thermal or electrical conductivity, for example, can be achieved by specific additions of colorants, mineral and/or organic fillers and/or carbon powders or metal powders.

Nitrile rubbers which can be employed in adhesives of the invention include, in particular, all acrylonitrile-butadiene copolymers with an acrylonitrile content of 15 to 50 wt %. Use may also be made of copolymers of acrylonitrile, butadiene, and isoprene. The fraction of 1,2-linked butadiene here is variable. The aforementioned polymers may be hydrogenated in varying degrees, and fully hydrogenated polymers with a double bond fraction of below 1% can also be utilized.

All of these nitrile rubbers are carboxylated to a certain degree, the fraction of the acid groups preferably being 2 to 15 wt %. Systems of these kinds are available commercially, for example, under the name Nipol 1072 or Nipol NX 775 from Zeon. Hydrogenated carboxylated nitrile rubbers are commercialized under the name Therban XT VP KA 8889 from Lanxess.

To increase the adhesion, the addition of tackifier resins compatible with the nitrile rubbers is also possible.

Epoxy resins are customarily understood to include both monomeric and oligomeric compounds having more than one epoxide group per molecule. These compounds may be reaction products of glycidyl esters or epichlorohydrin with bisphenol A or bisphenol F or with mixtures of these two. Likewise possible for use are epoxy novolak resins obtained by reacting epichlorohydrin with the reaction product of phenols and formaldehyde. Monomeric compounds having two or more epoxide end groups, used as diluents for epoxy resins, can also be used. Likewise possible is the use of elastically modified epoxy resins.

Examples of epoxy resins are Araldite™ 6010, CY-281™, ECN™ 1273, ECN™ 1280, MY 720, RD-2 from Ciba Geigy, DER™ 331, 732, 736, DEN™ 432 from Dow Chemicals, Epon™ 812, 825, 826, 828, 830 etc. from Shell Chemicals, HPT™ 1071 and 1079, likewise from Shell Chemicals, and Bakelite™ EPR 161, 166, 172, 191, 194, etc. from Bakelite AG.

Commercial aliphatic epoxy resins are, for example, vinylcyclohexane dioxides such as ERL-4206, 4221, 4201, 4289, or 0400 from Union Carbide Corp.

Elasticized epoxy resins are available from Noveon under the name Hycar.

Epoxide diluents, monomeric compounds having two or more epoxide groups, are, for example, Bakelite™ EPD KR, EPD Z8, EPD HD, EPD WF from Bakelite AG or Polypox™ R 9, R12, R 15, R 19, R 20 from UCCP.

With further preference the adhesive comprises more than one epoxy resin.

Examples of novolak resins which can be used include Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ N673 from DaiNippon Ink Chemistry or Epicote™ 152 from Shell Chemical.

As reactive resins it is also possible, furthermore, to use melamine resins, such as Cymel™ 327 and 323 from Cytec, for example.

As reactive resins it is also possible, furthermore, to use terpene-phenolic resins such as NIREZ™ 2019 from Arizona Chemical, for example.

As reactive resins it is also possible, furthermore, to use phenolic resins such as YP 50 from Toto Kasei, PKHC from Union Carbide Corp. and BKR 2620 from Showa Union Gosei Corp., for example.

As reactive resins it is also possible, furthermore, to use phenol resole resins, including in combination with other phenolic resins.

As reactive resins it is also possible, furthermore, to use polyisocyanates such as Coronate™ L from Nippon Polyurethan Ind., Desmodur™ N3300 or Mondur™ 489 from Bayer, for example.

In one advantageous version of the adhesive of the invention based on nitrile rubber there are additionally bond strength boosting (tackifying) resins added, very advantageously in a fraction of up to 30 wt %, based on the adhesive.

Tackifying resins to be added that can be used include without exception all tackifier resins already known and described in the literature. Those preferentially suitable include non-hydrogenated, partially hydrogenated or fully hydrogenated resins based on indene, rosin and rosin derivatives, hydrogenated polymers of dicyclopentadiene, non-hydrogenated or partially, selectively or fully hydrogenated hydrocarbon resins based on $C_5$, $C_5/C_9$ or $C_9$ monomer streams, terpenephenol resins, terpene resins based on α-pinene and/or ß-pinene and/or δ-limonene, or hydrogenated polymers of preferably pure $C_8$ and $C_9$ aromatics, aromatic resins such as coumarone-indene resins or resins of styrene or α-methylstyrene such as rosin and its derivatives such as disproportionated, dimerized, or esterified resins, such as glycols, glycerol or pentaerythritol.

Any desired combinations of these and further resins may be used in order to adjust the properties of the resultant adhesive in line with requirements. Generally speaking, it is possible to use all resins that are compatible (soluble) with the polymer in question. Express reference is made to the detailing of the state of knowledge in the "Handbook of Pressure Sensitive Adhesive Technology" by Donatas Satas (van Nostrand, 1989).

Besides the acid-modified or acid anhydride-modified nitrile rubbers already mentioned, it is also possible for further elastomers to be employed. As well as further acid-modified or acid anhydride-modified elastomers, unmodified elastomers may also be employed, such as, for example, polyvinyl alcohol, polyvinyl acetate, styrene block copolymers, polyvinyl formal, polyvinyl butyral or soluble polyesters.

Copolymers with maleic anhydride can be employed as well, such as, for example, a copolymer of polyvinyl methyl ether and maleic anhydride, obtainable for example under the name Gantrez™, sold by ISP.

The chemical crosslinking of the resins with the elastomers produces very high strengths within the adhesive.

Further additives which can typically be utilized include the following:
  primary antioxidants such as, for example, sterically hindered phenols
  secondary antioxidants such as, for example, phosphites or thioethers
  in-process stabilizers such as, for example, C radical scavengers
  light stabilizers such as, for example, UV absorbers or sterically hindered amines
  processing aids
  fillers such as, for example, silicon dioxide, glass (ground or in the form of beads), aluminum oxides, zinc oxides, calcium carbonates, titanium dioxides, carbon blacks, metal powders, etc.
  color pigments and dyes and also optical brighteners Through the use of plasticizers it is possible to increase the elasticity of the crosslinked adhesive. Plasticizers which can be used in this context include for example low molecular mass polyisoprenes, polybutadienes, polyisobutylenes or polyethylene glycols and polypropylene glycols, or plasticizers based on polyethylene oxides, phosphate esters, aliphatic carboxylic esters and benzoic esters. It is also possible, furthermore, to employ aromatic carboxylic esters, diols of relatively high molecular mass, sulfonamides and adipic esters.

Since the nitrile rubbers used, even at high temperatures, do not possess too low a viscosity, there is no escape of the adhesive from the bond line during adhesive bonding and hot pressing. During this operation, the epoxy resins crosslink with the elastomers, producing a three-dimensional network.

Through the addition of what are called accelerators it is possible to achieve a further increase in the reaction rate.
  Accelerators may be, for example, the following:
  tertiary amines such as benzyldimethylamine, dimethylaminomethylphenol and tris(dimethylaminomethyl)phenol
  boron trihalide-amine complexes
  substituted imidazoles
  triphenylphosphine
Examples of suitable accelerators include imidazoles, available commercially as 2M7, 2E4MN, 2PZ-CN, 2PZ-CNS, P0505, L07N from Shikoku Chem. Corp. or Curezol 2MZ from Air Products. A further suitable crosslinker comprises additions of HMTA (hexamethylenetetramine).

It is additionally possible optionally to add fillers (for example fibers, carbon black, zinc oxide, titanium dioxide, chalk, hollow or solid glass beads, microbeads of other materials, silica, silicates), nucleators, expandants, bond strength booster additives and thermoplastics, compounding agents and/or aging inhibitors, in the form for example of primary and secondary antioxidants or in the form of light stabilizers.

In a further preferred embodiment the adhesive is admixed with further additives, such as, for example, polyvinyl formal, polyacrylate rubbers, chloroprene rubbers, ethylene-propylene-diene rubbers, methyl-vinyl-silicone rubbers, fluorosilicone rubbers, tetrafluoroethylene-propylene copolymer rubbers, butyl rubbers and styrene-butadiene rubbers.

Polyvinylbutyrals are available as Butvar™ from Solucia, as Pioloform™ from Wacker and as Mowital™ from Kuraray. Polyacrylate rubbers are available as Nipol AR™ from Zeon. Chloroprene rubbers are available as Baypren™ from Bayer. Ethylene-propylene-diene rubbers are available as Keltan™ from DSM, as Vistalon™ from Exxon Mobil and as Buna EP™ from Bayer. Methyl-vinyl-silicone rubbers are available as Silastic™ from Dow Corning and as Silopren™ from GE Silicones. Fluorosilicone rubbers are available as Silastic™ from GE Silicones. Butyl rubbers are available as Esso Butyl™ from Exxon Mobil. Styrene-butadiene rubbers are available as Buna S™ from Bayer, as Europrene™ from Eni Chem and as Polysar S™ from Bayer.

Polyvinyl formals are available as Formvar™ from Ladd Research.

In a further preferred embodiment the adhesive is admixed with further additives, such as, for example, thermoplastic materials from the group of the following polymers: polyurethanes, polystyrene, acrylonitrile-butadiene-styrene terpolymers, polyesters, unplasticized polyvinyl chlorides, plasticized polyvinyl chlorides, polyoxymethylenes, polybutylene terephthalates, polycarbonates, fluorinated polymers, such as, for example, polytetrafluoroethylene, polyamides, ethylene-vinyl acetates, polyvinyl acetates, polyimides, polyethers, copolyamides, copolyesters, polyolefins such as, for example, polyethylene, polypropylene, polybutene, polyisobutene and poly(meth)acrylates.

The bond strength of the heat-activatable adhesive can be boosted by further specific additization. Thus, for example, polyimine copolymers or polyvinyl acetate copolymers can also be used as bond strength promoting adjuvants.

In another preferred variant, the adhesive applied to the carrier is a pressure-sensitive adhesive, this being an adhesive which even under relatively gentle applied pressure permits a durable bond to virtually all substrates and which after use can be detached from the substrate again substantially without residue. A pressure-sensitive adhesive is permanently tacky at room temperature, thus having a sufficiently low viscosity and a high tack, and so the surface of the bond base in question is wetted by the adhesive under just gentle applied pressure. The bondability of the adhesive derives from its adhesive properties, and the redetachability from its cohesive properties.

It is possible here to employ all known adhesive systems. Besides natural or synthetic rubber based adhesives there are, in particular, silicone adhesives and also polyacrylate adhesives, preferably a low molecular mass acrylate hotmelt pressure-sensitive adhesive, that can be used.

Preferred adhesives are those based on acrylate or silicone.

The adhesive may be selected from the group of the natural rubbers or the synthetic rubbers, or from any desired blend of natural rubbers and/or synthetic rubbers, with the natural rubber or the natural rubbers being selectable in principle from all available grades such as, for example, crepe, RSS, ADS, TSR or CV products, depending on required level of purity and viscosity, and the synthetic rubber or synthetic rubbers being selectable from the group of the randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes, and/or blends thereof.

With further preference the rubbers may have their processing qualities improved by the admixing of thermoplastic elastomers in a weight fraction of 10 to 50% by weight, based on the total elastomer fraction.

Representatives that may be mentioned at this point include in particular the especially compatible styrene-isoprene-styrene (SIS) and styrene-butadiene-styrene (SBS) products. Suitable elastomers for blending are also, for example, EPDM or EPM rubber, polyisobutylene, butyl rubber, ethylene-vinyl acetate, hydrogenated block copolymers made from dienes (for example, by hydrogenation of SBR, cSBR, BAN, NBR, SBS, SIS or IR; such polymers are known as SEPS and SEBS, for example), or acrylate copolymers such as ACM.

In addition, a 100% system based on styrene-isoprene-styrene (SIS) has been found to be suitable.

Crosslinking is advantageous for improving the removability of the adhesive tape after use, and may be accomplished thermally or by irradiation with UV light or electron beams.

For the purpose of the thermally induced chemical crosslinking it is possible to use all known, thermally activatable chemical crosslinkers such as accelerated sulfur or sulfur donor systems, isocyanate systems, reactive melamine, formaldehyde and (optionally halogenated) phenol-formaldehyde resins and/or reactive phenolic resin or diisocyanate crosslinking systems with the corresponding activators, epoxidized polyester resins and acrylate resins, and also combinations of these.

The crosslinkers are preferably activated at temperatures above 50° C., more particularly at temperatures from 100° C. to 160° C., very preferably at temperatures from 110° C. to 140° C.

The thermal excitation of the crosslinkers may also be accomplished by means of IR rays or high-energy alternating fields.

It is possible to use adhesives with a solvent basis, with an aqueous basis, or in the form of a hotmelt system. An acrylate hotmelt-based adhesive is suitable as well, and may have a K value of at least 20, more particularly greater than 30, obtainable by concentrating a solution of such an adhesive to form a system which can be processed as a hotmelt.

Concentration may take place in appropriately equipped tanks or extruders; especially in the case of accompanying degassing, a devolatilizing extruder is preferred.

One adhesive of this kind is set out in DE 43 13 008 A1, whose content is hereby referenced and is made part of the present disclosure and invention.

The acrylate hotmelt-based adhesive may also be chemically crosslinked, however.

In a further embodiment, self-adhesives used are copolymers of (meth)acrylic acid and the esters thereof with 1 to 25 C atoms, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers. The residual solvent content ought to be below 1% by weight.

One adhesive which has likewise shown itself suitable is a low molecular mass acrylate hotmelt pressure-sensitive adhesive, as carried by BASF under the designation acResin UV or Acronal®, more particularly Acronal® DS 3458 or AC Resin A 260UV. This low K value adhesive acquires its application-matched properties by virtue of a concluding crosslinking procedure initiated chemically by radiation.

Finally, it may also be mentioned that polyurethane-based adhesives are suitable as well.

For the purpose of optimizing the properties, the self-adhesive employed may be blended with one or more additives such as tackifiers (resins), plasticizers, fillers, pigments, UV absorbers, light stabilizers, aging inhibitors, crosslinking agents, crosslinking promoters or elastomers.

Tackifiers used are the resins already comprehensively described.

Suitable fillers and pigments are, for example, carbon black, titanium dioxide, calcium carbonate, zinc carbonate, zinc oxide, silicates or silica.

Suitable plasticizers are, for example, aliphatic, cycloaliphatic and aromatic mineral oils, diesters or polyesters of phthalic acid, trimellitic acid or adipic acid, liquid rubbers (for example nitrile rubbers or polyisoprene rubbers), liquid polymers of butene and/or isobutene, acrylic esters, polyvinyl ethers, liquid resins and plasticizing resins based on the raw materials for tackifying resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acid.

A "poly(meth)acrylate" is understood to be a polymer whose monomer basis consists to an extent of at least 60 wt % of acrylic acid, methacrylic acid, acrylic esters and/or methacrylic esters, with acrylic esters and/or methacrylic esters being present at least proportionally, preferably to an extent of at least 50 wt %, based on the overall monomer basis of the polymer in question. More particularly a "poly(meth)acrylate" is understood to be a polymer obtainable by radical polymerization of acrylic and/or methacrylic monomers and also, optionally, further, copolymerizable monomers.

In accordance with the invention the poly(meth)acrylate or poly(meth)acrylates is or are present at 30 to 65 wt %, based on the total weight of the pressure-sensitive adhesive (PSA). The PSA of the invention preferably comprises 35 to 55 wt %, based on the total weight of the PSA, of at least one poly(meth)acrylate.

The glass transition temperature of the poly(meth)acrylates which can be used in accordance with the invention is preferably <0° C., more preferably between −20 and −50° C.

The glass transition temperature of polymers or polymer blocks in block copolymers is determined in the context of this invention by means of dynamic scanning calorimetry (DSC).

The poly(meth)acrylates of the PSA of the invention are obtainable preferably by at least proportional copolymerization of functional monomers which preferably are crosslinkable with epoxide groups. These monomers are more preferably those with acid groups (particularly carboxylic acid, sulfonic acid or phosphonic acid groups) and/or hydroxyl groups and/or acid anhydride groups and/or epoxide groups and/or amine groups; monomers containing carboxylic acid groups are especially preferred. It is very advantageous in particular if the polyacrylate features copolymerized acrylic acid and/or methacrylic acid. All of these groups have crosslinkability with epoxide groups, thereby making the polyacrylate amenable advantageously to thermal crosslinking with introduced epoxides.

Other monomers which may be used as comonomers for the poly(meth)acrylates, aside from acrylic and/or methacrylic esters having up to 30 C atoms per molecule, are, for example, vinyl esters of carboxylic acids containing up to 20 C atoms, vinylaromatics having up to 20 C atoms, ethylenically unsaturated nitriles, vinyl halides, vinyl ethers of alcohols containing 1 to 10 C atoms, aliphatic hydrocarbons having 2 to 8 C atoms and one or two double bonds, or mixtures of these monomers.

The properties of the poly(meth)acrylate in question may be influenced in particular by variation in the glass transition temperature of the polymer through different weight fractions of the individual monomers. The poly(meth)acrylate(s) of the invention may be traced back preferably to the following monomer composition:

a) acrylic esters and/or methacrylic esters of the following formula:

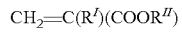

where $R^I$=H or $CH_3$ and $R^{II}$ is an alkyl radical having 4 to 14 C atoms, b) olefinically unsaturated monomers having functional groups of the kind already defined for reactivity with epoxide groups, c) optionally further acrylates and/or methacrylates and/or olefinically unsaturated monomers which are copolymerizable with component (a).

The fractions of the corresponding components (a), (b), and (c) are preferably selected such that the polymerization product has a glass transition temperature of <0° C., more preferably between −20 and −50° C. (DSC). It is particularly advantageous to select the monomers of the component (a) with a fraction of 45 to 99 wt %, the monomers of component (b) with a fraction of 1 to 15 wt % and the monomers of component (c) with a fraction of 0 to 40 wt % (the figures are based on the monomer mixture for the "basic polymer", in other words without additions of any additives to the completed polymer, such as resins etc.).

The monomers of component (a) are more particularly plasticizing and/or non-polar monomers. Used preferably as monomers (a) are acrylic and methacrylic esters having alkyl groups consisting of 4 to 14 C atoms, more preferably 4 to 9 C atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate and their branched isomers, such as isobutyl acrylate, isooctyl acrylate, isooctyl methacrylate, 2-ethylhexyl acrylate or 2-ethylhexyl methacrylate, for example.

The monomers of component (b) are more particularly olefinically unsaturated monomers having functional groups, more particularly having functional groups which are able to enter into a reaction with epoxide groups.

Used preferably for the component (b) are monomers having functional groups which are selected from the group encompassing the following: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, more particularly 2-hydroxyethyl acrylate, hydroxypropyl acrylate, more particularly 3-hydroxypropyl acrylate, hydroxybutyl acrylate, more particularly 4-hydroxybutyl acrylate, hydroxyhexyl acrylate, more particularly 6-hydroxyhexyl acrylate, hydroxyethyl methacrylate, more particularly 2-hydroxyethyl methacrylate, hydroxypropyl methacrylate, more particularly 3-hydroxypropyl methacrylate, hydroxybutyl methacrylate, more particularly 4-hydroxybutyl methacrylate, hydroxyhexyl methacrylate, more particularly 6-hydroxyhexyl methacrylate, allyl alcohol, glycidyl acrylate and glycidyl methacrylate.

In principle it is possible to use as component (c) all vinylically functionalized compounds which are copolymerizable with component (a) and/or with component (b). The monomers of component (c) may serve to adjust the properties of the resultant PSA.

Exemplary monomers of component (c) are as follows:
Methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, and vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, and macromonomers such as 2-polystyreneethyl methacrylate (weight-average molecular weight Mw, determined by means of GPC, of 4000 to 13 000 g/mol), and poly(methyl methacrylate)ethyl methacrylate (Mw of 2000 to 8000 g/mol).

Monomers of component (c) may advantageously also be selected such that they include functional groups which support a subsequent radiation-chemical crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

The polyacrylates ("polyacrylates" are understood in the context of the invention to be synonymous with "poly(meth)acrylates") may be prepared by methods familiar to the skilled person, especially advantageously by conventional radical polymerizations or controlled radical polymerizations. The polyacrylates may be prepared by copolymerization of the monomeric components using the customary polymerization initiators and also, optionally, chain transfer agents, the polymerization being carried out at the customary temperatures in bulk, in emulsion, for example in water or liquid hydrocarbons, or in solution.

Polyacrylates are prepared preferably by polymerization of the monomers in solvents, more particularly in solvents having a boiling range of 50 to 150° C., preferably of 60 to 120° C., using the customary amounts of polymerization initiators, which in general are 0.01 to 5, more particularly 0.1 to 2 wt %, based on the total weight of the monomers.

Suitable in principle are all customary initiators familiar to the skilled person. Examples of radical sources are peroxides, hydroperoxides and azo compounds, for example dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate and benzopinacol. One very preferred procedure uses as radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Solvents suitable for preparing the poly(meth)acrylates include alcohols such as methanol, ethanol, n- and isopropanol, n- and isobutanol, preferably isopropanol and/or isobutanol, and also hydrocarbons such as toluene and more particularly petroleum spirits with a boiling range from 60 to 120° C. Further possibilities for use include ketones such as preferably acetone, methyl ethyl ketone and methyl isobutyl ketone, and esters such as ethyl acetate, and also mixtures of solvents of the type stated, with preference being given to mixtures which comprise isopropanol, more particularly in amounts of 2 to 15 wt %, preferably 3 to 10 wt %, based on the solvent mixture employed.

The preparation (polymerization) of the polyacrylates is followed preferably by a concentration procedure, and the further processing of the polyacrylates takes place with substantial absence of solvent. The concentration of the polymer may be effected in the absence of crosslinker and accelerator substances. Also possible, however, is the addition of one of these classes of compound to the polymer even prior to the concentration, so that the concentration then takes place in the presence of said substance(s).

The weight-average molecular weights $M_w$ of the polyacrylates are preferably in a range from 20 000 to 2 000 000 g/mol; very preferably in a range from 100 000 to 1 500 000 g/mol, most preferably in a range from 150 000 to 1 000 000 g/mol. The figures for average molecular weight $M_w$ and for polydispersity PD in this specification relate to the determination by gel permeation chromatography. For this purpose it may be advantageous to carry out the polymerization in the presence of suitable chain transfer agents such as thiols, halogen compounds and/or alcohols, in order to set the desired average molecular weight.

The polyacrylates preferably have a K value of 30 to 90, more preferably of 40 to 70, measured in toluene (1% strength solution, 21° C.). The K value according to Fikentscher is a measure of the molecular weight and of the viscosity of the polymer.

Particularly suitable in accordance with the invention are polyacrylates which have a narrow molecular weight distribution range (polydispersity PD<4). These materials in spite of a relatively low molecular weight after crosslinking have a particularly good shear strength. The relatively low polydispersity also facilitates processing from the melt, since the flow viscosity is lower than for a broader-range polyacrylate while application properties are largely the same. Narrow-range poly(meth)acrylates can be prepared advantageously by anionic polymerization or by controlled radical polymerization methods, the latter being especially suitable. Via N-oxyls as well it is possible to prepare such polyacrylates. Furthermore, advantageously, Atom Transfer Radical Polymerization (ATRP) may be employed for the synthesis of narrow-range polyacrylates, the initiator used comprising preferably monofunctional or difunctional secondary or tertiary halides and the halide(s) being abstracted using complexes of Cu, Ni, Fe, Pd, Pt, Ru, Os, Rh, Co, Ir, Ag or Au.

The monomers for preparing the poly(meth)acrylates preferably include proportionally functional groups suitable for entering into linking reactions with epoxide groups. This advantageously permits thermal crosslinking of the polyacrylates by reaction with epoxides. Linking reactions are understood to be, in particular, addition reactions and substitution reactions. Preferably, therefore, there is a linking of the building blocks carrying the functional groups to building blocks carrying epoxide groups, more particularly in the sense of a crosslinking of the polymer building blocks carrying the functional groups via linking bridges comprising crosslinker molecules which carry epoxide groups. The substances containing epoxide groups are preferably polyfunctional epoxides, in other words those having at least two epoxide groups; accordingly, the overall result is preferably an indirect linking of the building blocks carrying the functional groups.

The poly(meth)acrylates of the PSA of the invention are crosslinked preferably by linking reactions—especially in the sense of addition reactions or substitution reactions—of functional groups they contain with thermal crosslinkers. All thermal crosslinkers may be used which not only ensure a sufficiently long processing life, meaning that there is no gelling during the processing operation, particularly the extrusion operation, but also lead to rapid postcrosslinking of the polymer to the desired degree of crosslinking at temperatures lower than the processing temperature, more particularly at room temperature. Possible for example is a combination of carboxyl-, amino- and/or hydroxyl-containing polymers and isocyanates, more particularly aliphatic or trimerized isocyanates deactivated with amines, as crosslinkers.

Suitable isocyanates are, more particularly, trimerized derivatives of MDI [4,4'-methylene-di(phenyl isocyanate)], HDI [hexamethylene diisocyanate, 1,6-hexylene diisocyanate] and/or IPDI [isophorone diisocyanate, 5-isocyanato- 1-isocyanatomethyl-1,3,3-trimethylcyclohexane], examples being the types Desmodur® N3600 and XP2410 (each BAYER AG: aliphatic polyisocyanates, low-viscosity HDI trimers). Likewise suitable is the surface-deactivated dispersion of micronized trimerized IPDI BUEJ 339®, now HF9® (BAYER AG).

Also suitable in principle for the crosslinking, however, are other isocyanates such as Desmodur VL 50 (MDI-based polyisocyanate, Bayer AG), Basonat F200WD (aliphatic polyisocyanate, BASF AG), Basonat HW100 (water-emulsifiable polyfunctional, HDI-based isocyanate, BASF AG), Basonat HA 300 (allophanate-modified polyisocyanate based on HDI isocyanurate, BASF) or Bayhydur VPLS2150/1 (hydrophilically modified IPDI, Bayer AG).

Preference is given to using thermal crosslinkers at 0.1 to 5 wt %, more particularly at 0.2 to 1 wt %, based on the total amount of the polymer to be crosslinked.

The poly(meth)acrylates of the PSA of the invention are crosslinked preferably by means of one or more epoxides or one or more substances containing epoxide groups. The substances containing epoxide groups are more particularly polyfunctional epoxides, in other words those having at least two epoxide groups; accordingly, the overall result is an indirect linking of the building blocks of the poly(meth) acrylates that carry the functional groups. The substances containing epoxide groups may be aromatic compounds and may be aliphatic compounds.

Outstandingly suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like), epoxy ethers of polyhydric phenols [more particularly resorcinol, hydroquinone, bis(4-hydroxyphenyl) methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl) propane, 2,2-bis(4-hydroxy-3,5-dichlorophenyl)propane, bis(4-hydroxyphenyl)phenylmethane, bis(4-hydroxyphenyl) diphenylmethane, bis(4-hydroxyphenyl)-4'-methylphenylmethane, 1,1-bis(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also their hydroxyethyl ethers, phenol-formaldehyde condensation products, such as phenol alcohols, phenol aldehyde resins and the like, S- and N-containing epoxides (for example N,N-diglycidylaniline, N,N'-dimethyldiglycidyl-4,4-diaminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids or are obtainable from other acidic compounds (cyanuric acid, diglycidyl sulfide, cyclic trimethylene trisulfone and/or derivatives thereof, and others).

Very suitable ethers are, for example, 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether), polypropylene glycol diglycidyl ether, trimethylolpropane triglycidyl ether, pentaerythritol tetraglycidyl ether, bisphenol A diglycidyl ether and bisphenol F diglycidyl ether.

Particularly preferred for the poly(meth)acrylates as polymers to be crosslinked is the use of a crosslinker-accelerator system ("crosslinking system") described for example in EP 1 978 069 A1, in order to gain more effective control over not only the processing life and crosslinking kinetics but also the degree of crosslinking. The crosslinker-accelerator system comprises at least one substance containing epoxide groups, as crosslinker, and at least one substance which has an accelerating effect on crosslinking reactions by means of epoxide-functional compounds at a temperature below the melting temperature of the polymer to be crosslinked, as accelerator.

Accelerators used in accordance with the invention are more preferably amines (to be interpreted formally as substitution products of ammonia; in the formulae below, these substituents are represented by "R" and encompass in particular alkyl and/or aryl radicals and/or other organic radicals), more especially preferably those amines which enter into no reactions or only slight reactions with the building blocks of the polymers to be crosslinked.

Selectable in principle as accelerators are primary ($NRH_2$), secondary ($NR_2H$) and tertiary ($NR_3$) amines, and also of course those which have two or more primary and/or secondary and/or tertiary amine groups. Particularly preferred accelerators, however, are tertiary amines such as, for example, triethylamine, triethylenediamine, benzyldimethylamine, dimethylaminomethylphenol, 2,4,6-tris(N,N-dimethylaminomethyl)phenol and N,N'-bis(3-(dimethylamino) propyl)urea. As accelerators it is also possible with advantage to use polyfunctional amines such as diamines, triamines and/or tetramines. Outstandingly suitable are diethylenetriamine, triethylenetetramine and trimethylhexamethylenediamine, for example.

Used with preference as accelerators, furthermore, are amino alcohols. Particular preference is given to using secondary and/or tertiary amino alcohols, where in the case of two or more amine functionalities per molecule, preferably at least one, and preferably all, of the amine functionalities are secondary and/or tertiary. As preferred aminoalcohol accelerators it is possible to employ triethanolamine, N,N-bis(2-hydroxypropyl)ethanolamine, N-methyldiethanolamine, N-ethyldiethanolamine, 2-aminocyclohexanol, bis(2-hydroxycyclohexyl)methylamine, 2-(diisopropylamino)ethanol, 2-(dibutylamino)ethanol, N-butyldiethanolamine, N-butylethanolamine, 2-[bis(2-hydroxyethyl) amino]-2-(hydroxymethyl)-1,3-propanediol, 1-[bis(2-hydroxyethyl)amino]-2-propanol, triisopropanolamine, 2-(dimethylamino)ethanol, 2-(diethylamino)ethanol, 2-(2-dimethylaminoethoxy)ethanol, N,N,N'-trimethyl-N'-hydroxyethyl bisaminoethyl ether, N,N,N'-trimethylaminoethylethanolamine and/or N,N,N'-trimethylaminopropylethanolamine.

Other suitable accelerators are pyridine, imidazoles (such as, for example, 2-methylimidazole) and 1,8-diazabicyclo [5.4.0]undec-7-ene. Cycloaliphatic polyamines as well may be used as accelerators. Suitable also are phosphate-based accelerators such as phosphines and/or phosphonium compounds, such as triphenylphosphine or tetraphenylphosphonium tetraphenylborate, for example.

Acrylate PSAs are typically radically polymerized copolymers of alkyl esters of acrylic acid or alkyl esters of methacrylic acid with C1 to C20 alcohols such as, for example, methyl acrylate, ethyl(meth)acrylate, n-butyl (meth)acrylate, tert-butyl(meth)acrylate, cyclohexyl(meth) acrylate, 2-ethylhexyl(meth)acrylate, n-octyl(meth)acrylate, isooctyl(meth)acrylate, n-decyl(meth)acrylate, n-dodecyl (meth)acrylate, tetradecyl(meth)acrylate, lauryl(meth)acrylate, oleyl(meth)acrylate, palmityl(meth)acrylate, and stearyl(meth)acrylate, as well as other esters of (meth) acrylic acid such as isobornyl(meth)acrylate, benzyl(meth) acrylate, phenyl(meth)acrylate, and 2-bromoethyl(meth) acrylate, and alkoxyalkyl(meth)acrylates such as ethoxyethyl(meth)acrylate. Additionally included here are esters of ethylenically unsaturated dicarboxylic and tricarboxylic acids and anhydrides such as ethyl maleate, dimethyl fumarate, and ethyl methyl itaconate. Likewise included are vinylaromatic monomers such as, for example, styrene, vinyltoluene, methylstyrene, n-butylstyrene, and decylstyrene.

Further possible monomers are vinyl esters of carboxylic acids comprising up to 20 carbon atoms, such as vinyl acetate or vinyl laurate, vinyl ethers of alcohols comprising up to 10 carbon atoms, such as vinyl methyl ether or vinyl isobutyl ether, vinyl halides such as vinyl chloride or vinylidene dichloride, nitriles such as acrylonitrile or methacrylonitrile, acid amides such as acrylamide or methacrylamide, and unsaturated hydrocarbons having 2 to 8 carbon atoms such as ethylene, propene, butadiene, isoprene, 1-hexene, or 1-octene.

Contemplated for the purpose of influencing the physical and optical properties of the PSA are polyfunctional, ethylenically unsaturated monomers as crosslinker monomers. Examples in this regard are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate, and tetraacrylates such as pentaerythritol tetraacrylate. Also included among the group of the polyfunctional monomers are UV-crosslinkable monomers, such as, for example, (meth)acrylate-functionalized derivatives of benzophenone or of benzoin.

Another group of monomers are those which generate a potential for latent crosslinking within the polymer and which, after the adhesive has dried, lead spontaneously (frequently with catalysis) to the construction of a network. An example of such a monomer is glycidyl methacrylate, whose oxirane ring leads to ring opening with hydroxyl functions or, in particular, with carboxylate functions and so to a covalent bond. This reaction takes place in accelerated form in the presence of zinc ions or—especially when carboxyl functions are present—of amines.

In order for pressure-sensitive adhesive properties to be obtained, the processing temperature of the adhesive must be above its glass transition temperature, in order to have viscoelastic properties.

Furthermore, acrylate-based activatable adhesives of the invention can be used. In that case, in one particularly preferred version, the activatable adhesives are constituted by a base polymer a) consisting of a1) 40 to 95 wt % of acrylic esters and/or methacrylic esters with the following formula

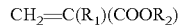

where $R_1$ is H or $CH_3$ and $R_2$ is H and/or alkyl chains having 1 to 30 C atoms a2) 5 to 30 wt % of a copolymerizable vinyl monomer having at least one carboxylic acid and/or sulfonic acid and/or phosphonic acid group a3) 1 to 10 wt % of a copolymerizable vinyl monomer having at least one epoxy group or one acid anhydride function a4) 0 to 20 wt % of a copolymerizable vinyl monomer which with the functional group is able to contribute to boosted cohesion, to an increase in the reactivity of the crosslinking, or to the direct crosslinking, and b) 5 to 50 wt % of an epoxy resin or of a mixture of two or more epoxy resins The polymer a) may comprise an activatable PSA which becomes pressure-sensitively adhesive on exposure to temperature and, optionally, pressure, and which after bonding and cooling develops a high bond strength through solidification. Depending on application temperature, these activatable PSAs have different static glass transition temperatures $T_{g,A}$ or melting points $T_{m,A}$.

In one very preferred version, monomers used for the monomers a1) are acrylic monomers which comprise acrylic and methacrylic esters with alkyl groups consisting of 4 to 14 C atoms, preferably 4 to 9 C atoms. Specific examples, without wishing this enumeration to impose any restriction, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof such as, for example, 2-ethylhexyl acrylate. Other classes of compound for use, which may likewise be added in minor amounts under a1), are methyl methacrylates, cyclohexyl methacrylates, isobornyl acrylate, and isobornyl methacrylates.

Used with preference as monomers a2) are itaconic acid, acrylic acid, methacrylic acid, vinylacetic acid, fumaric acid, crotonic acid, aconitic acid, dimethylacrylic acid, β-acryloyloxpropionic acid, trichloroacrylic acid, vinylphosphonic acid, and vinylsulfonic acid.

Used with preference as monomers a3) are glycidyl methacrylate, maleic anhydride, and itaconic anhydride.

One very preferred version uses, for the monomers a4), vinyl esters, vinyl ethers, vinyl halides, vinylidene halides, vinyl compounds with aromatic cycles and heterocycles in α-position. Here again, without exclusivity, a number of examples may be given: vinyl acetate, vinylformamide, vinylpyridine, ethyl vinyl ether, vinyl chloride, vinylidene chloride, and acrylonitrile.

One further very preferred version uses, for the monomers a4), monomers having the following functional groups: hydroxy, acid amide, isocyanato or amino groups.

Further particularly preferred examples for component a4) are hydroxyethyl acrylate, hydroxypropyl acrylate, hydroxyethyl methacrylate, hydroxypropyl methacrylate, allyl alcohol, acrylamide, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(buthoxymethyl)methacrylamide, N-methylolacrylamide, N-(ethoxymethyl)acrylamide, N-isopropylacrylamide, tetrahydrofurfuryl acrylate, this enumeration not being conclusive.

In a further preferred version, use is made, for component a4), of aromatic vinyl compounds, in which case preferably the aromatic rings consist of $C_4$ to $C_{18}$ and may also include heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

For the polymerization the monomers are selected in turn such that the resulting polymers can be used as industrially useful adhesives or PSAs, more particularly such that the resulting polymers have adhesive or pressure-sensitive adhesive properties in the sense of the "Handbook of Pressure Sensitive Adhesive Technology" by Donatas Satas (van Nostrand, New York 1989). Here as well the desired glass transition temperature can be controlled through the application of the Fox equation (E1) for the compilation of the monomer mixture on which the polymerization is based. For PSAs the static glass transition temperature of the resulting polymer is advantageously below 15° C.

In order to obtain a polymer glass transition temperature $T_{g,A}$ of ≥30° C. for heat-activatable adhesive, the monomers are very preferably selected, and the quantitative composition of the monomer mixture advantageously chosen, in accordance with the remarks above, in such a way as to give the desired $T_{g,A}$ value for the polymer in accordance with the Fox equation (E1) (cf. T. G. Fox, Bull. Am. Phys. Soc. 1 (1956) 123).

$$\frac{1}{T_0} = \sum_n \frac{w_n}{T_{g,n}} \quad (E1)$$

In this equation n represents the serial number of the monomers used, $w_n$ the mass fraction of the respective monomer n (wt %), and $T_{g,n}$ the respective glass transition temperature of the homopolymer of the respective monomers n in K.

For the preparation of the adhesives, advantageously, conventional radical polymerizations or controlled radical polymerizations are carried out. For the polymerizations proceeding by a radical route, preference is given to using initiator systems which further comprise other radical initiators for the polymerization, especially thermally decomposing radical-forming azo or peroxo initiators. Suitable in principle, however, are all of the initiators that are typical for acrylates and familiar to the skilled person. The production of C-centered radicals is described in Houben Weyl, Methoden der Organischen Chemie, Vol. E 19a, pages 60 to 147. These methods are preferentially employed analogously.

Examples of radical sources are peroxides, hydroperoxides, and azo compounds; certain nonexclusive examples of typical radical initiators may be given here as potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate, and benzopinacol. One very preferred version uses 1,1'-azobis (cyclohexanecarbonitrile) (Vazo 88™ from DuPont) as radical initiator.

The average molecular weights $M_n$ of the PSAs resulting from the radical polymerization are very preferably selected such that they are in a range from 20 000 to 2 000 000 g/mol; specifically for further use as pressure-sensitive hotmelt adhesives, PSAs are prepared that have average molecular weights $M_n$ of 100 000 to 500 000 g/mol.

The polymerization can be conducted in bulk, in the presence of one or more organic solvents, in the presence of water, or in mixtures of organic solvents and water. The aim here is to minimize the amount of solvent used.

Depending on conversion and temperature, the polymerization time is between 4 and 72 hours. The higher the level at which it is possible to select the reaction temperature, in other words the higher the thermal stability of the reaction mixture, the lower the reaction time can be.

In order to increase the cohesion between the adhesive and the film, the film may be subjected to a corona treatment.

Also advantageous is the etching of the film, in order to be able to anchor the adhesive.

In one variant of the invention, there is a primer present between lower film and adhesive in order to improve the adhesion of the adhesive on the film.

Descriptions of the primers customarily used are found for example in "Handbook of Pressure Sensitive Adhesive Technology" by Donatas Satas (van Nostrand, 1989).

The upper and lower films in the diecut preferably have the same shape and size and are disposed congruently.

With further preference, these conditions also apply to any other films present.

A typical size of the diecut, allowing many of the smaller holes to be closed, is represented by a (circular) disk having a diameter of 10 to 60 mm, more particularly 30 to 40 mm.

The lower film is preferably coated over its full area with the adhesive.

The method of the invention for closing a hole especially in a vehicle body with a diecut of the invention is characterized by the following steps:
  application of the diecut to the hole to be closed, in such a way that the hole is completely covered by the diecut causing temperatures of 120° C. to 200° C., more particularly 175° C., to act on the diecut for 15 minutes, so that the heat-activatable adhesive cures and the hole is closed as a result The diecut withstands even temperatures of, for example, 190° C. or more for several minutes, if for example there is a line fault and the (automobile) bodies stay for longer in the drying ovens.

The curing of the adhesive is preferably accomplished by supply of heat during the customary finishing operation on the bodyshell, more particularly during drying of the paint finish, the underbody protection, or the cathodic electrocoat. In this way there is no need for any additional work cycle.

Sufficient energy is present as a result of the requisite heating of the body during said drying operations.

Alternatively is a local supply of energy by means of thermal or infrared emitters possible.

It is preferred for the diecut to be applied concentrically over the hole to be closed.

The contours of the diecut preferably correspond to the contour of the hole to be closed. In this way the overlap of the individual layers of the diecut is symmetrical. The margin of overlap is preferably between 1 and 20 mm, more preferably between 5 and 10 mm.

The diecut of the invention is superior to the solutions known from the prior art, particularly under heightened mechanical stress. The same is true when the soundproofing is considered. The soundproofing and the strength are improved massively by the use of a carrier laminate with a heavy-duty film.

Furthermore, a single embodiment of the diecut is able to cover a multiplicity of holes of different sizes.

The diecut is distinguished by:
  very high load-bearing capacity/puncture resistance
  very good sealing with respect to moisture/moisture barrier
  effective sealing with respect to noises/sound damping The puncture resistance is determined by closing a hole with a diecut and subjecting it to targeted puncture. In this case, a pin is clamped into a tensile testing machine, this pin moving at a constant speed toward the horizontally positioned, closed hole and puncturing it to a distance of 30 mm. During this procedure, the force that has to be applied is recorded.

According to one advantageous embodiment of the invention, the diecut has puncture resistances of 200 to 2000 N.

The surface of the diecut part offers an appealing and smooth surface in respect of optical qualities and tactile qualities.

Test Methods

The measurements are conducted (unless otherwise indicated) under testing conditions of 23±1° C. and 50±5% relative humidity.

Molar Mass Mn and the Weight-Average Molar Mass Mw

The figures for the number-average molar mass Mn and the weight-average molar mass Mw in this specification relate to the determination by gel permeation chromatography (GPC). The determination is made on 100 µl of sample subjected to clarifying filtration (sample concentration 4 g/l).

The eluent used is tetrahydrofuran with 0.1 vol % of trifluoroacetic acid. The measurement is made at 25° C.

The precolumn used is a PSS-SDV-type column, 5 µm, $10^3$ Å, 8.0 mm*50 mm (statements here and below in the following order: type, particle size, porosity, internal diameter*length; 1 Å=$10^{-10}$ m). Separation takes place using a combination of the columns of type PSS-SDV, 5 µm, $10^3$ Å and also $10^5$ Å and $10^6$ Å each of 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration) in the case of polyacrylates and against PS standards (polystyrene calibration) otherwise (resins, elastomers).

The polyacrylates preferably have a K value of 30 to 90, more preferably of 40 to 70, as measured in toluene (1% strength solution, 21° C.). The K value according to Fikentscher is a measure of the molecular weight and the viscosity of the polymer.

K Value

The principle of the method is based on capillary-viscosimetric determination of the relative solution viscosity. For this purpose the test substance is dissolved by shaking for thirty minutes in toluene, to give a 1% strength solution. In a Vogel-Ossag viscometer at 25° C. the flow time is measured and from this, in relation to the viscosity of the pure solvent, the relative viscosity of the sample solution is ascertained. The K value can be read off from tables by the method of Fikentscher [P. E. Hinkamp, Polymer, 1967, 8, 381] (K=1000 k).

Glass Transition Temperature

The glass transition temperature is determined by means of dynamic scanning calorimetry (DSC). This is done by weighing out 5 mg of an untreated polymer sample into an aluminum crucible (volume 25 µL) and closing the crucible with a perforated lid. Measurement takes place using a DSC 204 F1 from Netzsch. For inertization, operation takes place under nitrogen. The sample is first cooled to −150° C., then heated to +150° C. at a heating rate of 10 K/min, and again cooled to −150° C. The subsequent, second heating curve is run again at 10 K/min, and the change in the heat capacity is recorded. Glass transitions are recognized as steps in the thermogram.

Figure 2:
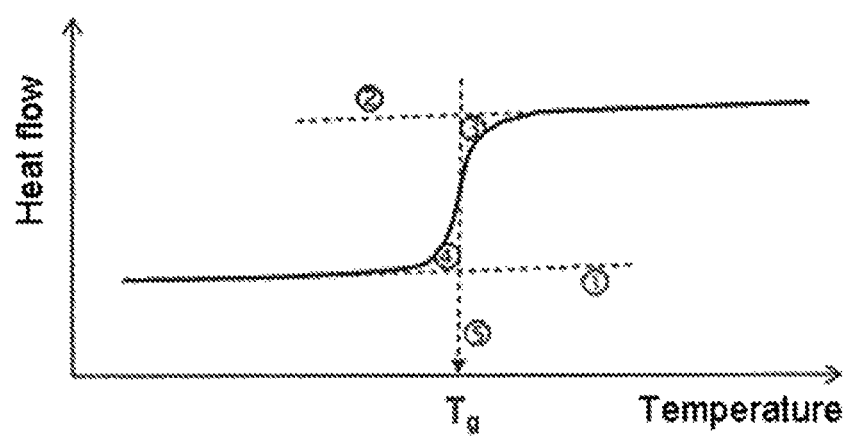
FIG. 2 is graphical illustration of the glass transition temperature with heat flow increasing along the y-axis and temperature increasing along the x-axis in an embodiment.

The glass transition temperature is evaluated as follows (see FIG. 2):

A tangent is applied in each case to the baseline of the thermogram before ① and after ② the step. In the region of the step, a balancing line ⑤ is placed parallel to the ordinate in such a way that it intersects the two tangents, specifically so as to form two areas ③ and ④ of equal content (between in each case the tangent, the balancing line, and the measuring plot). The point of intersection of the balancing lines thus positioned with the measuring plot gives the glass transition temperature.

Below, on the basis of a figure, the diecut for the permanent closing of holes especially in metal sheets or in plastics parts of automobile bodies is to be elucidated in more detail, without any intention of a restrictive effect in any form.

FIG. 1 shows a hole in a body that is to be closed, and also the state after which thermal exposure has closed the hole that was to be closed.

The body 5 contains, as a result of its construction, a hole 6, which is to be closed.

For this purpose, a diecut 1 with a carrier composed of a laminate of at least two polymeric films, namely an upper film 2 and a lower film 3, the lower film 3 having a basis weight of at least 1.5 kg/m², and a curable adhesive 4 is fixed on the hole 6 in such a way that the hole 6 is covered fully by the diecut.

The area of the diecut 1 is greater than the area of the hole 6 to be closed.

The diecut 1 is joined permanently to the body 5 by subjecting the diecut briefly to high temperatures that lead to the activation of the adhesive 4.

The invention claimed is:

1. A method comprising:
    applying a diecut to a hole such that the hole is covered by the diecut; and
    causing temperatures of 120° C. to 200° C. to act on the diecut so that an applied adhesive cures and closes the hole,
    wherein:
    the diecut comprises an upper polymeric film and a lower polymeric film;
    the lower polymeric film comprises a polyolefin and a mineral filler;
    the lower polymeric film has a basis weight between 1.5 and 3.9 kg/m²;
    the lower polymeric film has a thickness between 600 and 3,500 µm;
    the lower polymeric film is disposed between the upper polymeric film and the applied adhesive; and
    the applied adhesive is a curable adhesive.

2. The method according to claim 1, wherein the upper polymeric film consists of polyethylene terephthalate.

3. The method according to claim 1, wherein the upper polymeric film has a thickness between 15 and 350 µm.

4. The method according to claim 1, wherein the cured adhesive is a self-adhesive and the self-adhesive is an acrylate-based self-adhesive composition.

5. The method according to claim 1, wherein the diecut is applied concentrically over the hole.

6. The method according to claim 1, wherein:
    the diecut further comprises a first contour;
    the edge of the hole comprises a second contour; and
    the first contour and the second contour correspond.

7. The method according to claim 1, wherein:
the diecut further comprises a first contour;
the edge of the hole comprises a second contour; and
the first contour and the second contour correspond such that the diecut overlaps the hole by between 1 and 20 mm.

8. The method according to claim 1, wherein the lower polymeric film has a basis weight of between 1.5 and 2.5 kg/m$^2$.

9. The method according to claim 3, wherein the thickness of the upper polymeric film is between 15 and 150 μm.

10. The method according to claim 1, wherein the thickness of the lower polymeric film is between 1,700 and 3,500 μm.

11. The method according to claim 1, wherein the curable adhesive is a structural adhesive.

12. The method according to claim 11, wherein the curable adhesive is a reactive, heat-activatable adhesive composition.

13. The method according to claim 12, wherein the curable adhesive comprises a nitrile rubber and a phenolic resin.

14. The method according to claim 1, wherein the curable adhesive is disposed between the lower polymeric film and a self-adhesive.

15. The method according to claim 1, wherein the lower polymeric film is 0.015 to 12 mm thick.

16. The method according to claim 1, wherein the lower polymeric film further comprises 8 to 20 vol % of an oil.

17. The method according to claim 1, wherein a metal foil is disposed between the upper polymeric film and the lower polymeric film.

18. The method according to claim 1, wherein the upper polymeric film further comprises a filament.

19. The method according to claim 1, wherein the lower polymeric film further comprises a filament.

20. The method according to claim 2, wherein:
the upper polymeric film has a thickness between 15 and 350 μm; and
the cured adhesive is a self-adhesive and the self-adhesive is an acrylate-based self-adhesive composition.

* * * * *